United States Patent
Sato et al.

(10) Patent No.: US 9,259,772 B2
(45) Date of Patent: Feb. 16, 2016

(54) FORMING APPARATUS

(75) Inventors: Takeyuki Sato, Osaka (JP); Manabu Ninomiya, Osaka (JP); Hiroaki Yabuta, Osaka (JP); Takeshi Watanabe, Osaka (JP); Tomoyasu Nakano, Osaka (JP)

(73) Assignee: Nakata Manufacturing Co., Ltd., Osaka (JP)

( * ) Notice: Subject to any disclaimer, the term of this patent is extended or adjusted under 35 U.S.C. 154(b) by 661 days.

(21) Appl. No.: 13/519,445

(22) PCT Filed: Dec. 28, 2009

(86) PCT No.: PCT/JP2009/071808
§ 371 (c)(1),
(2), (4) Date: Jun. 27, 2012

(87) PCT Pub. No.: WO2011/080839
PCT Pub. Date: Jul. 7, 2011

(65) Prior Publication Data
US 2012/0285005 A1    Nov. 15, 2012

(51) Int. Cl.
*B21B 31/10* (2006.01)
*B21B 31/08* (2006.01)
*B23Q 3/157* (2006.01)
*B21D 5/12* (2006.01)

(52) U.S. Cl.
CPC ............... *B21B 31/106* (2013.01); *B21B 31/08* (2013.01); *B21D 5/12* (2013.01); *B23Q 3/157* (2013.01); *Y10T 29/53* (2015.01)

(58) Field of Classification Search
CPC ........ B21B 31/08; B21B 31/14; B21B 31/10; B21B 31/106; B21B 31/12; B21B 2031/02; B21B 2031/20; B21B 2031/023; B21B 2031/025; B21B 2031/026; B21B 2031/021; B23Q 3/157; B21D 5/12
USPC ............... 72/48, 67, 184, 199, 245, 247, 292, 72/293, 380, 392, 394, 404, 407, 411, 417, 72/418, 419, 429, 444, 446, 457, 237–239
See application file for complete search history.

(56) References Cited

U.S. PATENT DOCUMENTS 3,525,244 A * 8/1970 Bohnenkamp .................. 72/238
3,845,646 A   11/1974 Bellmann et al.
4,763,505 A   8/1988 Klute et al.
(Continued)

FOREIGN PATENT DOCUMENTS

| CN | 87100390 | 9/1987 |
| CN | 2399126 | 10/2000 |
| CN | 201140198 | 10/2008 |

(Continued)

*Primary Examiner* — Debra Sullivan
(74) *Attorney, Agent, or Firm* — Hamre, Schumann, Mueller & Larson, P.C.

(57) ABSTRACT

In a forming apparatus, inner frames are arranged in a forming roll stand so as to move up and down. Mechanical structures of convexo-concave engagement are provided on opposed faces between respective roll chocks and yokes and the inner frames. After connection with a pressing device is released, the roll chocks and yokes are guided utilizing the moving-downward motion of the inner frames, and a stack body is formed in series so as to be withdrawn from the roll stand. The stack body is disassembled utilizing the moving-upward motion of the inner frames, and the roll chocks and yokes can be guided to the desired positions inside the stand and locked.

3 Claims, 8 Drawing Sheets

(56) References Cited

U.S. PATENT DOCUMENTS

| | | | |
|---|---|---|---|
| 5,090,228 A | * | 2/1992 | Schmiedberg et al. ......... 72/238 |
| 5,497,644 A | | 3/1996 | Poloni et al. |

FOREIGN PATENT DOCUMENTS

| | | |
|---|---|---|
| ES | 349289 | 4/1969 |
| JP | 57-032829 | 2/1982 |
| JP | 58-168441 | 10/1983 |
| JP | 08-103816 | 4/1996 |
| JP | 10-235432 | 9/1998 |
| JP | 11-267761 | 10/1999 |
| JP | 3044247 | 5/2000 |
| JP | 3145480 | 3/2001 |
| JP | 3609940 | 1/2005 |
| JP | 3779839 | 5/2006 |
| JP | 3938918 | 6/2007 |
| RU | 2229352 | 5/2004 |
| SU | 528022 | 9/1976 |
| SU | 1729281 | 4/1992 |
| SU | 1731315 | 5/1992 |
| WO | 03/047783 | 6/2003 |

* cited by examiner

FORMING APPARATUS

TECHNICAL FIELD

The present invention is related to an improvement of a forming apparatus which is so constructed that in a forming roll stand having four-way rolls, for example, a stack body which is formed by mounting roll chocks and yokes for pivotally supporting respective rolls on one another in series is exchanged by withdrawing only the stack body in a horizontal direction perpendicular to a product proceeding direction. More particularly, the invention is related to the forming apparatus having a simple structure in which inner frames are disposed in the forming roll stand so as to move up and down, and mechanical structures are disposed between faces of the roll chocks and yokes and the inner frames opposed to each other, thereby eliminating necessity of providing actuators such as hydraulic cylinders for forming, disassembling, and positioning the stack body, except an actuator for moving the inner frames up and down.

BACKGROUND ART

In an electric resistance welded pipe forming mill for forming a pipe from a strip-shaped steel plate, a universal mill for forming strip material into various sectional shapes and so on, forming rolls in respective forming roll stands must be exchanged at high frequency, according to types and sizes of products. Therefore, for the purpose of easily exchanging the rolls in a short time, various devices and methods for executing the exchange have been heretofore proposed.

In case of exchanging only an inner roll unit in cage forming, the relevant inner roll unit is lifted by pulling it from an upper part of the roll stand. Thereafter, the inner roll unit is withdrawn in a direction of a width of material which is perpendicular to a product proceeding direction to be exchanged with a new inner roll unit which has been separately prepared, and the inner roll unit after the exchange is returned to the roll stand in a reverse flow to the above (PTL 1). In case of exchanging an upper roll unit in a pipe welding roll stand, it is also possible to conduct the exchange in the same manner (PTL 2).

In case of a four-way roll stand such as an electric resistance welded pipe forming mill and a mill, as a structure where an inner stand provided with four-way rolls is disposed in a post of the roll stand so as to move up and down, a method of exchanging an entirety of the inner stand with a new inner stand provided with the four-way rolls which has been separately prepared has been put into practical use (PTL 3).

However, in this structure, only the four-way rolls are mounted on the inner stand, and pressing devices such as jacks and various actuators to be connected thereto must be provided on an outer stand. Therefore, connection and disconnection between these devices are complicated, and additionally, works for mounting and detaching the rolls in the inner stand in an offline are also complicated. Moreover, it is necessary to prepare a plurality of the inner stands, and a large investment is required for storing these inner stands and for keeping a place for storage.

Accordingly, there has been proposed such a structure that an upper roll chock for pivotally supporting upper rolls, right and left side roll yokes for pivotally supporting right and left side rolls, and a lower roll chock for pivotally supporting lower rolls are assembled by stacking them in series by mutual insertion or pin connection thereby to form a stack body of the roll chocks, and the stack body is withdrawn in a horizontal direction perpendicular to a product proceeding direction to be exchanged with another stack body of the roll chocks which has been separately prepared (PTLs 4 and 5).

CITATION LIST

Patent Literature

[PTL 1] JP-A-58-168441
[PTL 2] JP-B-3938918 (WO2003/047783)
[PTL 3] JP-A-57-032829
[PTL 4] JP-B-3145480
[PTL 5] JP-B-3779839

SUMMARY OF INVENTION

Technical Problem

In either of the conventional forming apparatuses which are so constructed that the inner stand provided with the four-way forming rolls is inserted into the outer stand which is fixed in the product proceeding direction, from a vertical direction or a horizontal direction, to be mounted therein, and then, detached to be transferred, it is necessary to secure cost for the devices and the place for storing the inner stands, because a plurality of the inner stands must be separately prepared and stored. Further, lifting and withdrawing devices for mounting or dismounting the inner stand, position sensors and stand locking devices for enabling the inner stand to be mounted or dismounted, and so on are indispensable in both the inner stand and the outer stand. Therefore, a structure of the apparatus is complicated, and mounting and dismounting operation of the inner stand are also complicated.

In the structure where the stack body of the roll chocks which is formed by stacking the roll chocks and yokes for pivotally supporting the rolls, after connections with the pressing devices are released, can be withdrawn from the roll stand in a direction of the width of the material to be worked, there is no necessity of preparing a plurality of the inner stands.

However, in this structure, hydraulic lifting devices, actuators and so on for stacking the roll chocks and yokes to form the stack body and transfer it, and for positioning and locking the roll chocks and yokes at predetermined positions in the roll stand, by disassembling the stack body which has been introduced into the roll stand must be provided in the relevant stand. Therefore, not only the structures of these mounting and dismounting devices, but also, mounting and dismounting operations of the devices are complicated.

An object of the invention is to provide a forming apparatus having a structure as simple as possible, in which exchange of rolls can be easily conducted, without mounting hydraulic actuators and so on for assembling and disassembling a stack body of roll chocks and yokes on an inner frame or a roll stand, in case where a structure of exchanging a stack body which is formed by stacking only roll chocks and yokes for pivotally supporting the rolls, by withdrawing the stack body from a forming roll stand in a horizontal direction perpendicular to a product proceeding direction, is employed in an electric resistance welded pipe forming mill or in a universal mill.

Solution To Problem

The inventors have carried out various researches for the purpose of omitting the actuators of various types for lifting and fixing the roll chocks and yokes, and employing a structure as simple as possible, in the forming apparatus where the stack body formed by stacking the roll chocks and yokes on one another in series can be introduced and withdrawn in the horizontal direction perpendicular to the product proceeding direction of the forming roll stand. As the results, the inventors have focused in incorporating inner frames in the forming roll stand so as to ascend and descend, and in utilizing the ascending and descending motions of the inner frames for forming and disassembling the stack body of the roll chocks and yokes.

The inventors have further earnestly studied on mechanical structures for utilizing the ascending and descending motions of the inner frames, and consequently, adopted a structure for holding the inner frames in the forming roll stand so as to ascend and descend. They have found that the roll chocks and yokes can be easily arranged and fixed by adopting such a structure that mechanical structures of convexo-concave engagement are disposed in advance on desired faces of the roll chocks and yokes and the inner frames opposed to each other, and after connection with a pressing device, for example, is released, the roll chocks and yokes are guided, utilizing the descending motion of the inner frames thereby to form the stack body in series so that the stack body can be withdrawn from the roll stand, and to the contrary, after the stack body of the roll chocks and yokes is disassembled, utilizing the ascending motion of the inner frames, the roll chocks and yokes are guided to the predetermined positions in the stand, and then, connected to the pressing device. The inventors have found that by adopting the above described structure, the actuators for lifting the roll chocks and yokes can be omitted, on occasion of forming or disassembling the stack body, and thus, completed this invention.

Specifically, this invention is a forming apparatus comprising a pair of inner frames having plate-like shape and incorporated in an outer frame which is uprightly provided on a base board, so as to move only in a vertical direction;

upper and lower horizontal roll chocks and right and left side roll yokes, locked between the inner frames so as to be separatable from each other by mechanical structures;

two position adjusting devices for moving the upper and lower horizontal roll chocks close to or apart from each other, which are provided on the outer frame or the base board;

two position adjusting devices for moving right and left side rolls which are locked between the inner frames close to or apart from each other, one of the two position adjusting devices being installed at end portion between the inner frames, and the other being installed on the outer frame or between the inner frames so as to move in the vertical direction; and an exchanging rail provided in a lower part of the outer frame in a horizontal direction perpendicular to a product proceeding direction, wherein the upper and lower horizontal roll chocks are constrained from moving in the horizontal direction, and the right and left side roll yokes are constrained from moving in the vertical direction by the mechanical structures, when the inner frames ascend, thereby to lock the respective roll chocks and yokes at predetermined positions inside the inner frames, and the locks are released when the inner frames descend, so that a stack body of the roll chocks and yokes are formed, by mounting the right and left side roll yokes on the lower horizontal roll chock, and mounting the upper horizontal roll chock on the right and left side roll yokes, thereby the stack body configured to be withdrawn in a direction of the rail.

The inventors further propose the structure in which the upper and lower horizontal roll chocks and right and left side roll yokes are engaged by the mechanical structures which are formed between strip members provided on faces of the frames and on the upper and lower horizontal roll chocks and right and left side roll yokes opposed to the faces of the frames, and grooves formed between the strip members, and at the same time, the structure in which the base board on which the outer frame is uprightly provided is held so as to slide in the horizontal direction perpendicular to the product proceeding direction.

Advantageous Effects of Invention

According to this invention, there is adopted the structure in which the inner frames are uprightly provided in the forming roll stand so as to ascend and descend, and the mechanical structures having simple structures are arranged on the faces of the roll chocks and yokes and the inner frames opposed to each other. By adopting the structure capable of forming and disassembling the stack body of the roll chocks and yokes, utilizing the ascending motion of the inner frames, and further, capable of positioning the side rolls, utilizing the mechanical structures to be engaged with the inner frames, there is no necessity of providing the actuators such as hydraulic cylinders which have been heretofore indispensable for assembling and disassembling the stack body, and for positioning the roll chocks and yokes, except the actuators for ascending and descending the inner frames. Because a control mechanism and an operating mechanism for the actuators are not required, it is possible to obtain the forming apparatus having an extremely simple structure.

In this invention, the roll stand includes, for example, the outer frame and the inner frames, the outer and inner frames can be formed of plate-like or frame-like members, and the simple structure including, for example, convexo-concave engagements formed by the strip members can be adopted as the mechanical structures to be engaged with the roll chocks and yokes. As the results, an entirety of the forming roll stand can be simplified and downsized.

For example, because the above described mechanical structures which can constrain movements in the product line direction, and in the vertical and horizontal directions perpendicular to the product line direction are provided on the desired faces of the side roll yokes and the inner frames opposed to each other, forming loads of the side rolls can be borne by the inner frames only, and forming loads of the upper and lower roll chocks can be borne by the outer frame. In this manner, a structurally rational design can be achieved.

DESCRIPTION OF EMBODIMENTS

Figure 1A:
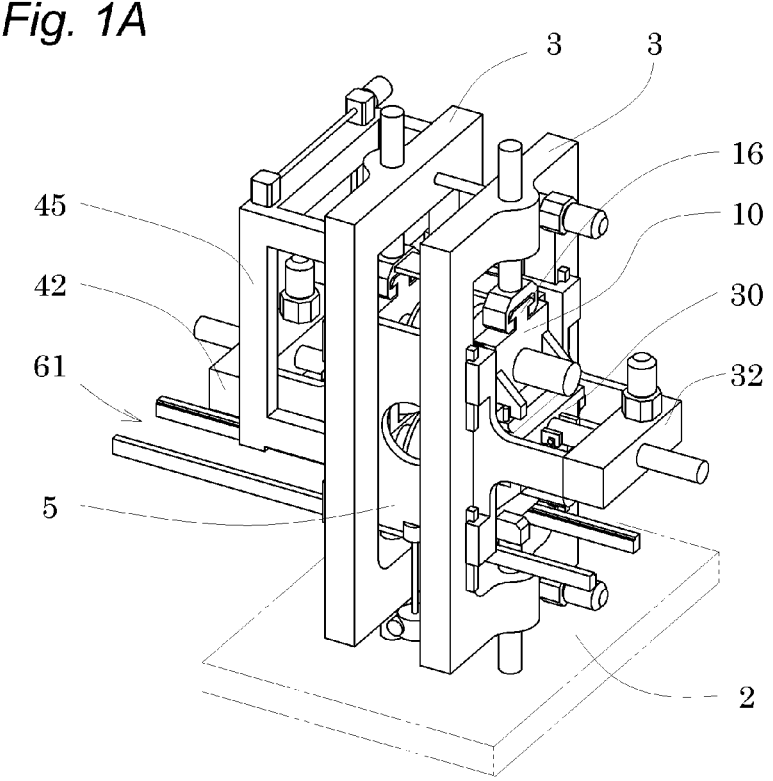
FIG. 1A is an explanatory perspective view showing an example of a forming apparatus having four-way rolls equipped in a stand, in an online state where the forming apparatus is operable, as seen from the front in a product proceeding direction.
Figure 1A:
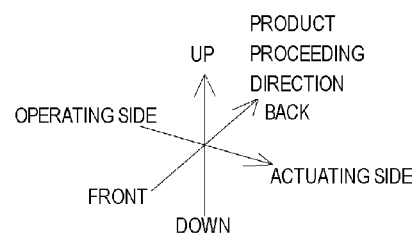
Figure 1B:
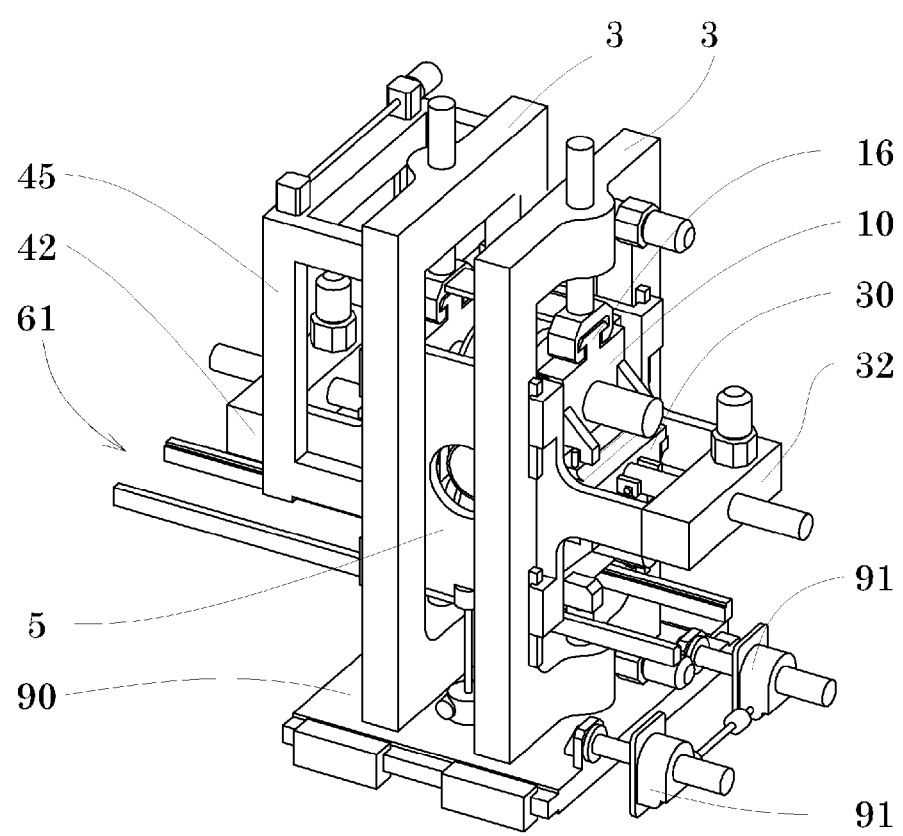
FIG. 1B is an explanatory perspective view showing another embodiment of the forming apparatus having the four-way rolls equipped in the stand, in the online state where the forming apparatus is operable, as seen from the front in the product proceeding direction.

In this invention, as a forming roll stand, a structure including inner frames in a shape of a plate, and an outer frame in a shape of a rectangular frame which incorporates and holds the inner frames, as shown in an embodiment, or any known structure can be adopted, provided that the forming roll stand can be provided with forming rolls such as four-way rolls, roll chocks and yokes for pivotally supporting the forming rolls, and pressing devices connected to the respective roll chocks and yokes thereby to press material to be worked or position adjusting devices for adjusting positions of the rolls.

A method of mounting the roll chocks and yokes for forming the stack body is appropriately selected from those methods, for embodiment, abutting contact between faces, engagement between a pin and a hole or between a rod and a groove, face contact, etc., and a combination of various mechanical structures, according to shapes, sizes and weights of the respective roll chocks at upper and lower sides and at both sides.

Moreover, for connecting the respective roll chocks and yokes to the pressing devices and the position adjusting devices, either of known structures can be adopted. As the pressing devices and the position adjusting devices, either of known structures such as a hydraulic actuator using oil pressure or water pressure, a jack as shown in the embodiment can be adopted.

As the outer frame, either of known structures such as a pair of rectangular frames which are used in the embodiment, besides, post-like members having a gate shape or a plate shape or a combination of the gate shape and the plate shape can be adopted.

As the inner frames, cross-shaped plate members used in the embodiment, besides, plates in a rectangular shape or in an octagonal shape may be adopted. Further, the plates may be provided with cutouts or relief holes for weight reduction. Anyway, the shape of the inner frames is not particularly limited. However, in this embodiment, in case where the inner frames are so constructed as to bear all loads of the side roll yokes, depending on engaging mechanisms, it is recommended to appropriately select such a shape and size as capable of bearing the load.

As a lifting device for the inner frames, either of known mechanisms such as a hydraulic actuator and a jack which is shown in the embodiment can be adopted.

As the mechanical structures to be provided on the faces of the roll chocks and yokes and the inner frames opposed to each other, an example of convexo-concave engagement in which convex parts and grooves are formed, using convex strip members, is adopted in the embodiment. However, it is possible to adopt either of the known structures besides the example in the embodiment, provided that the following functions are satisfied.

Specifically, the stack body of the roll chocks and yokes is formed by mounting a pair of the side roll yokes on an upper face of the lower roll chock, and then, mounting the upper roll chock on the side roll yokes so as to override upper faces thereof. Moreover, the upper and lower roll chocks are adjusted in position in the vertical direction, and the side roll yokes are adjusted in position in the horizontal direction, for positioning the four-way rolls inside the inner frames. Accordingly, the upper and lower roll chocks are movable in the vertical direction, but locked so as to be positioned in the horizontal direction, and the side roll yokes are movable in the horizontal direction, but locked so as to be positioned in the vertical direction. Therefore, a function of guiding the roll chocks and yokes so as to be locked at positions of desired heights with the ascending and descending motions of the inner frames is required. Basically, it is necessary to support the roll chocks and yokes by the convex strip members and pin members, or to guide the roll chocks and yokes through desired grooves.

As a mechanical structure for allowing the side roll yokes to be positioned or released with respect to the inner frames, on occasion of connecting or disconnecting a side roll shaft to or from the pressing device, or on occasion of positional adjustment between them, it is possible to commonly use the above described mechanical structures for forming or disassembling the stack body, as shown in the embodiment. Besides, it is also possible to use a separate independent structure.

As a structure for exchanging the stack body of the roll chocks and yokes, by transferring and withdrawing the stack body on an exchanging rail, after the stack body has been assembled utilizing the ascending and descending motions of the inner frames, either of known structures can be adopted.

Embodiment 1

FIG. 1A is an explanatory perspective view showing an embodiment of the forming apparatus, and shows an operable online state where the four-way rolls are mounted in a forming roll stand 1. As shown in the drawing, a direction from this side to a deep side in the drawing is called as a product proceeding direction. This side in the drawing is an inlet side of raw material, and the deep side in the drawing is an outlet side of the raw material. As seen from the stand, the inlet side of the raw material is called as a front side, while the outlet side of the raw material is called as a back side. Moreover, a left side in a lateral direction of the drawing is called as an operating side, while a right side in the lateral direction is called as an actuating side.

Figure 2:
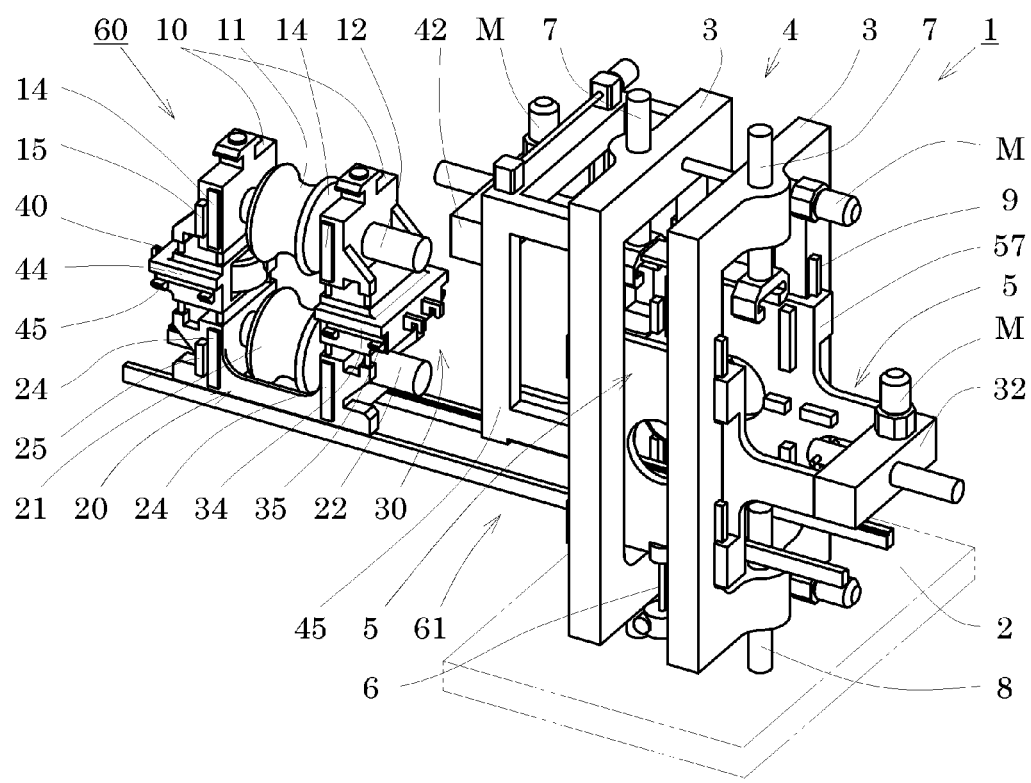
FIG. 2 is an explanatory perspective view showing an embodiment of the forming apparatus in an offline state where a stack body of roll chocks and yokes is withdrawn from the forming apparatus, as seen from the front in the product proceeding direction.
Figure 3:
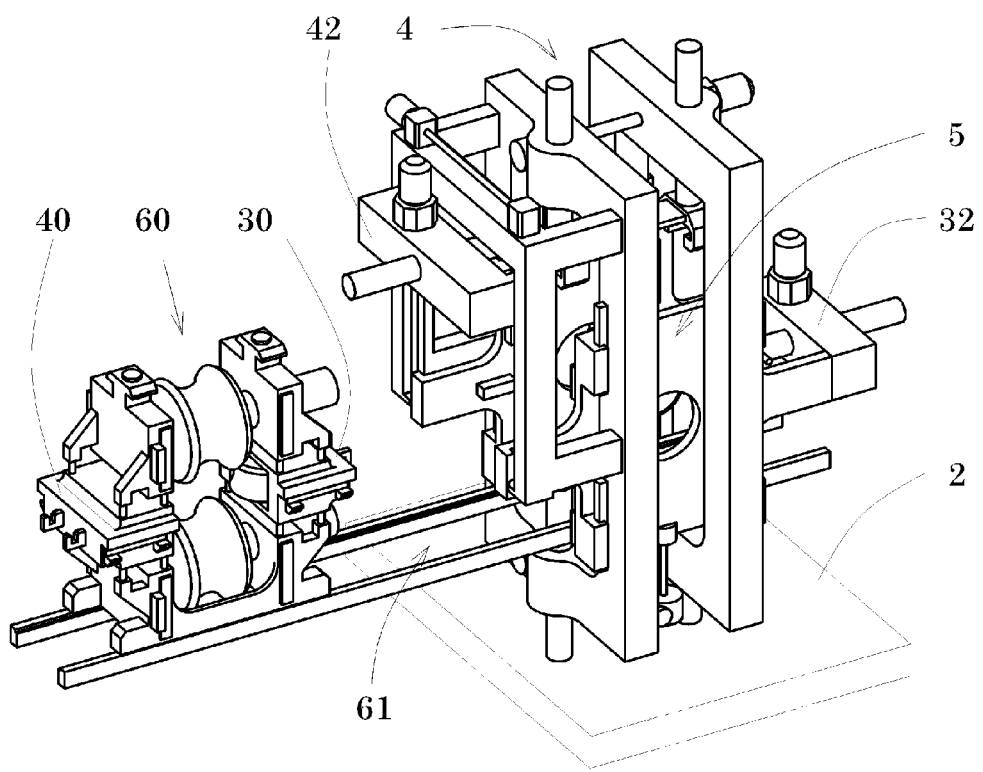
FIG. 3 is an explanatory perspective view showing the forming apparatus in FIG. 2, as seen from a direction which is different by 90 degree in a lateral direction in FIG. 2.

FIGS. 2 and 3 show the forming apparatus in an offline state where a stack body 60 of roll chocks and yokes is withdrawn from the forming roll stand 1. The stack body 60 is formed by mounting side roll yokes 30, 40 on a lower roll chock 20, and by further mounting an upper roll chock 10 on the side roll yokes.

The forming roll stand 1 includes an outer frame 4 which is composed of a pair of rectangular frames 3, 3, and a pair of inner frames 5, 5 which are disposed inside the outer frame 4. The outer frame 4 is so constructed that a pair of the rectangular frames 3, 3 are arranged in parallel at a predetermined interval at both sides of the product proceeding direction, and uprightly mounted on a base board 2 in such a manner that longer sides of the rectangular frames 3, 3 are directed in a vertical direction, while shorter sides are directed in the product proceeding direction. Although not shown in the drawings, a pair of the rectangular frames 3, 3 are appropriately provided with horizontal frames for connecting them to each other at their upper and lower ends.

The inner frames 5, 5 are formed of a pair of plates which are opposed to each other at a predetermined interval in the product proceeding direction. Specifically describing, each one of the plates is mounted so as to move up and down, utilizing its inner face at a longer side in a vertical plane perpendicular to the product proceeding direction, that is, the same vertical plane of a pair of the rectangular frames 3, 3, as a rail.

The plates composing the inner frames 5, 5 are plates having a substantially cross shape, and respectively provided with round holes through which material to be worked is passed, in center parts of the cross-shaped plates. Vertical strip members 51, 52 formed of rods for guiding the upper and lower roll chocks 10, 20 in the vertical direction are provided on vertical parts which are positioned at both sides of the round holes on opposed faces of the plates (See FIGS. 4 and 5). Moreover, their opposite faces are abutted against inner faces at the longer sides of the rectangular frames 3, 3, and further, engaging parts 57 to be engaged with rail members 9 which are provided on side faces at the longer sides of the rectangular frames 3, 3 are provided at ends of the vertical parts.

On the other hand, horizontal parts are formed in the horizontal direction of the round holes of the inner frames 5, 5. The horizontal parts are respectively provided with horizontal guides 53, 54 formed of a pair of short rod members which are arranged at a predetermined interval in the horizontal direction so as to be engaged with the side roll yokes 30, 40, on the opposed faces of the plates (See FIGS. 4 and 5).

As the lifting devices in the vertical direction, jacks 6, 6, are provided on the base board 2 inside the outer frame 4, in contact with lower end members of the inner frames 5, 5, and hold the inner frames 5, 5 so as to move up and down.

As the position adjusting devices in the vertical direction, upper and lower jacks 7, 8 are provided on the frame parts at the shorter sides of the rectangular frames 3, 3 which are positioned in upper and lower parts of the outer frame 4. The upper and lower jacks 7, 8 are respectively connected to the upper roll chock 10 and the lower roll chock 20 so that pressing forces for the material to be worked can be imparted to upper and lower rolls 11, 21.

A jack 32, as the position adjusting device in the horizontal direction to be connected to the right side roll yoke 30, and its drive source M are provided at the actuating side of the horizontal parts of the inner frames 5, 5. The jack 32 at the actuating side has a box-like shape, and moves up and down together with the inner frames 5, 5, because it is disposed and locked between a pair of the inner frames 5, 5.

The side roll yoke 40 at the operating side is provided with a jack 42 having a box-like shape, as the position adjusting device in the horizontal direction to be connected to the side roll yoke 40. A frame 45 for vertical movement is disposed outside the rectangular frame 3 at the operating side, and the jack 42 is engaged with the frame 45 so as to move up and down, and supported by a vertically moving rod which is suspended from the frame 45. Specifically, when the jack 45 in the horizontal direction at the operating side moves upward, a pair of the inner frames 5, 5 at the operating side are opened, thereby enabling the stack body 60 to be inserted into or withdrawn from the inner frames.

Although the frame 45 for vertical movement is provided outside the rectangular frame 3 of the outer frame 4, it is also possible to provide the frame 45 for vertical movement at ends of the horizontal parts of a pair of the inner frames 5, 5 at the operating side. In the same manner, when the jack moves upward in this place, the inner frames 5, 5 at the operating side can be opened, thereby enabling the stack body 60 to be inserted into or withdrawn from the inner frames.

Below the plates of a pair of the inner frames 5, 5, and near the lower jack 8, there is disposed an exchanging rail 61 which extends toward the operating side in a direction perpendicular to the product proceeding direction.

In the stack body 60 of the roll chocks and yokes, four pins 33, 4 are uprightly provided at a predetermined interval on respective upper faces and lower faces of a pair of the side roll yokes 30, 40, while engaging holes are provided at desired positions in leg portions which are formed on a lower face of the upper roll chock 10 and on an upper face of the lower roll chock 20. On occasion of assembling the stack body 60, the pins are engaged with the engaging holes, and thus, stacking operation is completed. Moreover, wheels for enabling the stack body 60 to run on the exchanging rail 61 are provided in a lower part of the lower roll chock 20.

Although not shown in the drawings, a conveyor is disposed along the exchanging rail 61 so that an L-shaped engaging tool can move by chain drive. By engaging the L-shaped engaging jig with a hole which is provided in a lower end part of the lower roll chock 20 at the actuating side, the stack body 60 can be moved in a direction of the rail. Moreover, although not shown in the drawings, a table part which is movable in a direction perpendicular to the rail (the product proceeding direction) is disposed at the operating side of the exchanging rail 61, for the purpose of exchanging the stack body 60 with a new stack body 60 which has been separately prepared.

The mechanical structures which are provided on the faces of the stack body 60 opposed to the inner frames 5, 5 will be described. As shown in FIG. 2, the lower roll chock 20 and the upper roll chock 10 are respectively provided with guide plates 24, 14 which function as slide faces, on their respective vertical parts at both sides. Further, vertical slider blocks 15, 25 formed of short rod members are arranged in parallel outside the guide plates 24, 14 at the operating side.

The side roll yokes 30, 40 are respectively provided with horizontal strip parts 34, 44 in a shape of a convex rib having a length extending over an entirety of the horizontal parts in the lateral direction. Below these horizontal strip parts 34, 44, horizontal guide members 35, 45 formed by projecting short rod members are respectively provided at a predetermined interval in the horizontal direction, and horizontal grooves having a desired width are formed between the horizontal strip parts 34, 44 and the horizontal guide members 35, 45.

Figure 4:
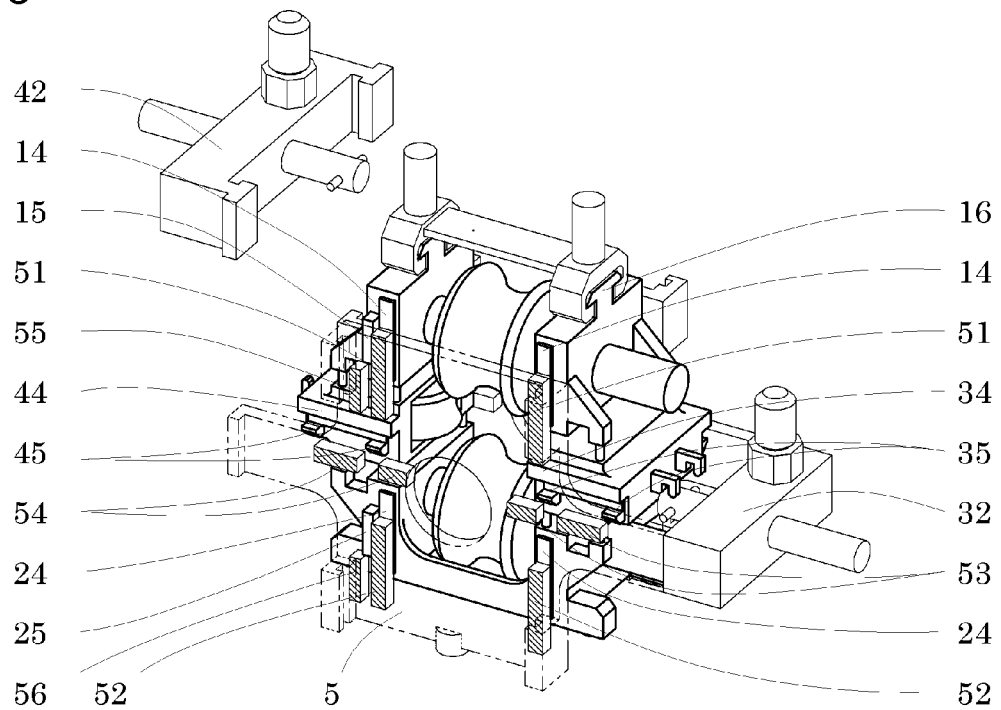
FIG. 4 is an explanatory perspective view showing positional relation between respective mechanical structures which are provided on faces of an inner frame at an inlet side in the product proceeding direction and the stack body opposed to each other, and positional relation between the inner frame and jacks for side roll yokes, in a state where the stack body of the roll chock and yokes can be transferred into or from the inner frames.
Figure 4:
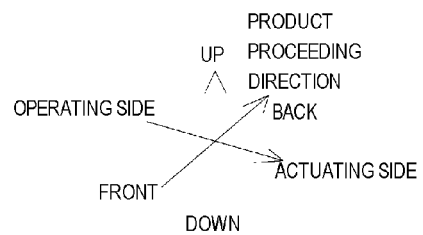
Figure 5:
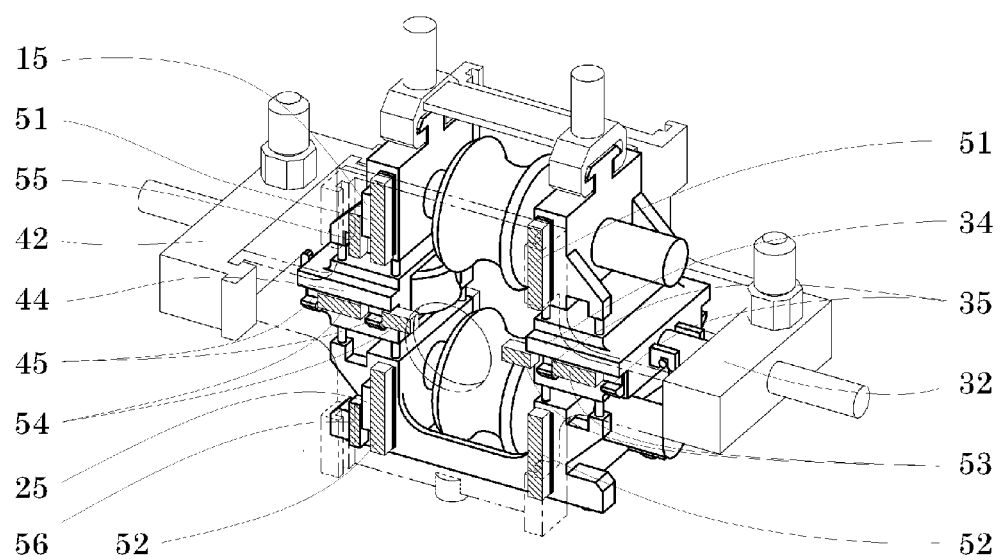
FIG. 5 is an explanatory perspective view showing positional relation between the respective mechanical structures which are provided on the faces of the inner frame at the inlet side in the product proceeding direction and the faces of respective roll chokes and yokes opposed to each other, and positional relation between the inner frame and the jacks for the side roll yokes, in a state where the inner frames have ascended up to a fixed position.
Figure 6:
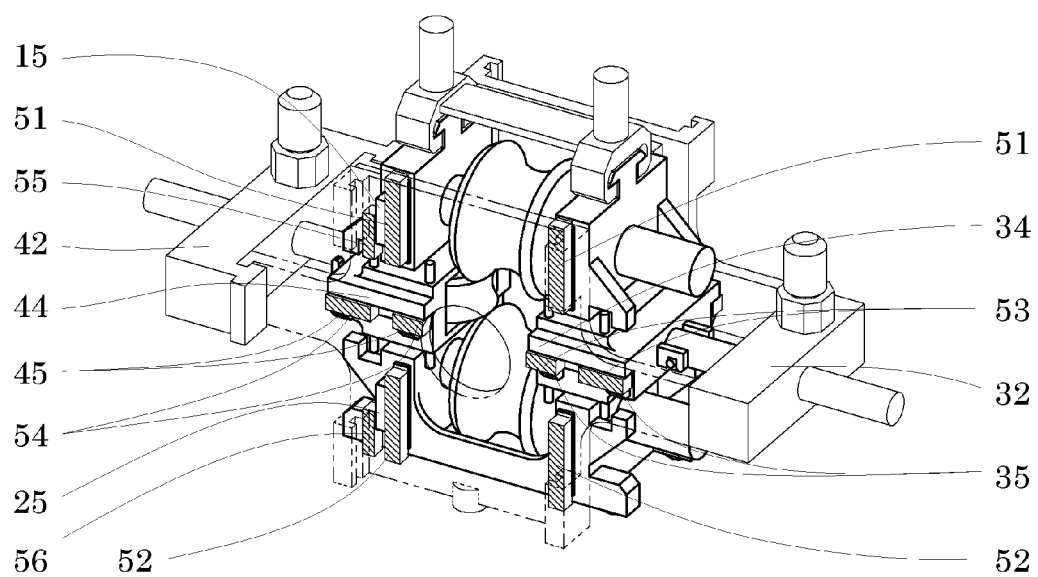
FIG. 6 is an explanatory perspective view showing positional relation between the respective mechanical structures which are provided on the faces of the inner frame at an outlet side in the product proceeding direction and the respective roll chokes and yokes opposed to each other, and positional relation between the inner frame and the jacks for the side roll yokes, in the operable state.

Referring to FIGS. 4, 5 and 6, how the stack body 60 is engaged with the mechanical structures, when the inner frames 5, 5 move up and down will be described.

FIG. 4 is an explanatory perspective view showing positional relation between the mechanical structures which are provided on the faces of the plate and the stack body 60 opposed to each other at the inlet side in the product proceeding direction (a front side of the stand), when the stack body 60 is inserted between a pair of the plates of a pair of the inner frames 5, 5 which has descended to the lowermost position. In the drawing, the members provided on the plate are hatched so as to distinguish them from the members on the stack body 60.

As a first step, the jack 42 at the operating side is lifted up to the uppermost position inside the frame 45 for vertical movement, for the purpose of inserting the stack body 60 into the inner frames 5, 5.

In order that the stack body 60 may be inserted up to a predetermined vertical position and stop there, vertical strip parts 51, 52 formed of rod members are provided on the plates of the inner frames 5, 5 at relative positions where side faces of the vertical slider blocks 15, 25 of the lower roll chock 20 and the upper roll chock 10 at the operating side are to be abutted. Moreover, a length of vertical guide members 55, 56 which form vertical grooves in combination with the vertical strip parts 51, 52 is made shorter so as not to interfere with the vertical slider block 15, 25 of the upper and lower roll chocks 10, 20.

On the opposed faces of the inner frames 5, 5, there are provided horizontal guides 53, 54 having a width capable of being inserted into the guide grooves between the horizontal strip parts 34, 44 and the horizontal guide members 35, 45 of the side roll yokes 30, 40, and formed of a pair of short rods which are arranged in a line at a predetermined interval. When the stack body 60 is inserted, a pair of the horizontal guide members 35, 45 of the side roll yokes 30, 40 are positioned above a pair of the horizontal guides 53, 54 on the plates. The horizontal guide members 35, 45 are offset from the horizontal guides 53, 54 so that they may not interfere with each other, on occasion of the vertical movement, and clearances are set so that they can pass each other.

As shown in FIGS. 2 and 4, in a state where the stack body 60 is inserted, a T-shaped member 16 provided on an upper face of the upper roll chock 10 is fitted into an engaging groove which is formed in a hook part at a distal end of a rod of the upper jack 7, thereby to constrain the upper roll chock 10 and the upper jack 7 from moving in the product proceeding direction. Therefore, the rod of the upper jack 7 has been lowered beforehand up to a desired position, before the stack body 60 is inserted.

FIG. 5 is an explanatory perspective view showing positional relation between the respective mechanical structures which are provided on the faces of the inner frame 5 and the roll chocks and yokes opposed to each other, in a state where the inner frames 5, 5 are lifted by the jack 6 from the lowermost position to a fixed position, the right and left side roll yokes 30, 40 are separated from the lower roll chock 20, and the jack 42 which has descended inside the frame 45 for vertical movement is connected to the side roll yoke 40.

Simultaneously when the inner frames 5, 5 are lifted, the upper jack 7 is operated to lift the upper roll chock 10. It is also possible to lift the upper roll chock 10, by operating the jack 7 beforehand. At this time point, the pins on the upper faces of the side roll yokes 30, 40 are withdrawn from the pin holes in the leg portions of the upper roll chock 10, thereby allowing the side roll yokes 30, 40 to move in the horizontal direction.

When the inner frames 5, 5 have ascended, the vertical slider blocks 15, 25 of the lower roll chock 20 and the upper roll chock 10 relatively move to enter into the grooves which are formed between the vertical strip parts 51, 52 and the vertical guides 55, 56. In this manner, the vertical strip members are aligned in the horizontal direction, and thus, positioning in the horizontal direction is performed.

When the inner frames 5, 5 have ascended, a pair of the horizontal guide members 53, 54 on the plates pass the clearances of the horizontal guide members 35, 45 of the side roll yokes 30, 40 to be abutted against the horizontal strip members 34, 44. Although only the front side in the product proceeding direction has been described, it is apparent that the plate at the back side has the same structure. Because the side roll yokes 30, 40 are lifted by the two plates, the pins of the right and left side roll yokes 30, 40 are withdrawn from the pin holes in the lower roll chock 20, thereby allowing the side roll yokes 30, 40 to move in the horizontal direction.

Moreover, in the state where the stack body 60 is inserted, a jack rod of the lower jack 8 which is the position adjusting device at the lower side is abutted against the lower face of the lower roll chock 20, thereby allowing the lower roll chock 20 itself to ascend or descend.

FIG. 6 is an explanatory perspective view showing positional relation between the respective mechanical structures, in a state where desired positional adjustments have been completed, from a state where the stack body 60 is disassembled with the ascending motion of the inner frames 5, 5 as shown in FIG. 5, to a state where the upper and lower rolls 11, 21, and right and left side rolls 31, 41 are locked at predetermined positions inside the inner frames 5, 5.

When the right and left side rolls 31, 41 are moved in a direction of approaching to each other by the jacks 32, 42 of the position adjusting device, a pair of the horizontal guide members 53, 54 on the plate are positioned in the grooves between the horizontal strip parts 34, 44 and the horizontal guide members 35, 45 of the side roll yokes 30, 40. In this manner, the horizontal strip members are aligned in the vertical direction thereby to perform the positional adjustment in the vertical direction.

Basically, it is so set that the rolls may be brought into the positions in the operable state, by lifting the lower roll chock 20 by the lower jack 8, and by lowering the upper roll chock 10 by the upper jack 7.

According to the above described mechanical structures, when the inner frames 5, 5 ascend, the side roll yokes 30, 40 are separated from the lower roll chock 20 and lifted up to the predetermined position, while the lower roll chock 20 stays as it is, and the upper roll chock 10 is simultaneously lifted by the upper jack 7. In this manner, the lower roll chock 20 and the upper roll chock 10 are constrained from moving in the horizontal direction perpendicular to the product proceeding direction, while the side roll yokes 30, 40 are constrained from moving in the vertical direction, and hence, the stack body 60 is disassembled.

When the inner frames 5, 5 ascend, a rod pin of the jack 32 is engaged with a connecting jig which is provided at the outer end of the side roll yoke 30, and can be automatically connected thereto. Meanwhile, a rod pin of the jack 42 which has descended inside the frame 45 for vertical movement can be automatically connected to a connecting jig which is provided at the outer end of the side roll yoke 40.

Specifically, because the jack 32 extends before the inner frames 5, 5 ascend, a distal end of the jack shaft comes near the side roll yoke 30 at the actuating side, and because the jack 42 descends and extends, a distal end of the jack shaft comes near the side roll yoke 40. Along with the ascending motions of the inner frames 5, 5, pins at the distal ends of the jack shafts are respectively fitted into U-shaped locking jigs at the ends of the yokes 30, 40, and after the ascending motions, either of the pins moves toward the center by the extending motions of the jacks 32, 42. Accordingly, the horizontal guide members 35, 45 too move apart from the clearances of the horizontal guide members 53, 54. As the results, the side roll yokes 30, 40 are locked in the vertical direction, locked in the horizontal direction by the jacks 32, 42, and locked between a pair of the inner frames 5, 5 in the product proceeding direction. Therefore, the inner frames 5, 5 receive all the load of the side roll yokes 30, 40.

An embodiment where the connection between the upper roll chock 10 and the jack rod of the upper jack 7 is completed, simultaneously when the stack body 60 enters into the inner frames 5, 5, has been heretofore described. However, it is also possible to complete the connection, while the inner frames 5, 5 ascend. Specifically, when the inner frame 5, 5 ascend, the upper roll chock 10 which is placed on the side roll yokes 30, 40 comes into contact with the jack rod of the upper jack 7. Therefore, the upper roll chock 10 can be automatically connected to the jack rod, by providing, for embodiment, a jig to be engaged with a connection part which is formed at a top of the upper roll chock 10, when the inner frames ascend, on the distal end of the jack rod.

For example, it is possible to adopt such a structure that a lever mechanism is provided between the inner frames 5, 5 and the upper jack 7, and the upper roll chock 10 is engaged with a spring actuated clamper which is provided at the distal end of the shaft of the upper jack, when the inner frames 5, 5 ascend.

The lower roll chock 20 is also engaged with the lower jack, when the lower jack extends, and moves to ascend up to the desired position. Therefore, the loads of the upper and lower roll chocks are borne by the rectangular frames 3, 3 of the outer frame 4.

Figure 7A:
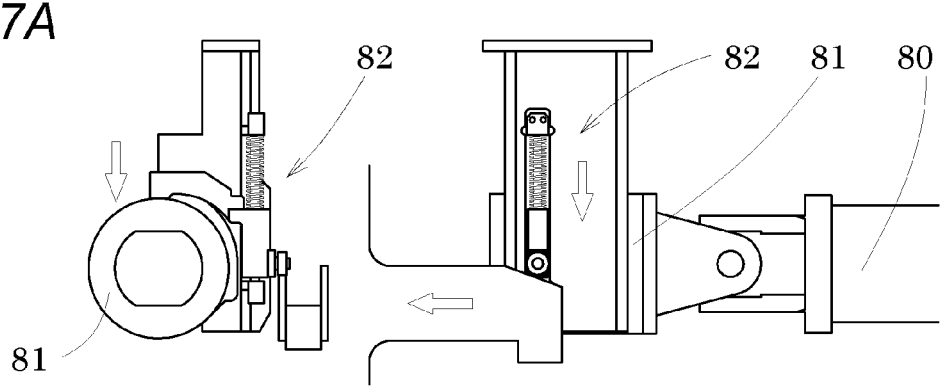
FIG. 7A is an explanatory view showing locking motion of a spring-operated damper which is provided in a joint part for connecting a roll shaft of an upper roll chock and an actuating shaft for actuating it, wherein the right side in the drawing is a front view as seen from the inlet side in the product proceeding direction, and the left side is a side view of the same.
Figure 7B:
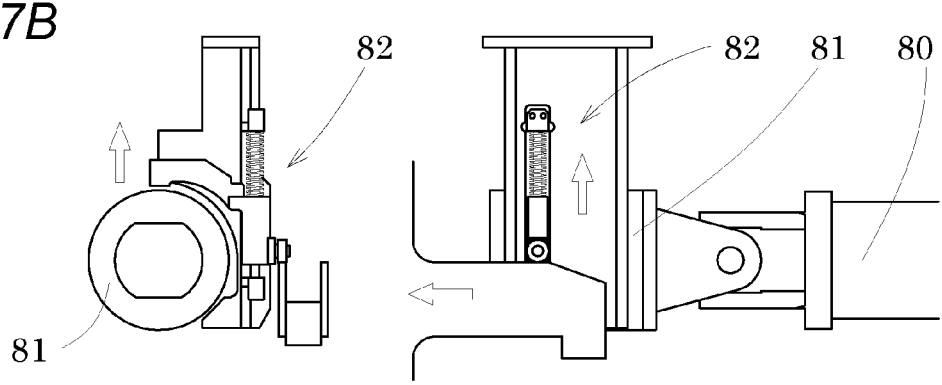
FIG. 7B is an explanatory view showing unlocking motion of the spring-operated damper which is provided in the joint part for connecting the roll shaft of the upper roll chock and the actuating shaft for actuating it, wherein the right side in the drawing is a front view as seen from the entry side in the product proceeding direction, and the left side is a side view of the same.

Referring to FIGS. 7A and 7B, connection of actuating shafts, which are not shown in FIG. 1A, with distal ends of an upper roll shaft 12 and a lower roll shaft 22, for actuating the upper and lower rolls, will be described. The upper roll shaft 12 and the lower roll shaft 22 are respectively provided with joint parts 81 to be connected to an actuating shaft 80 from a drive source which is not shown. When the inner frames descend, the joint parts 81 are held by spring actuated dampers 82 which are provided on the inner frames, and allowed to be separated from the roll shafts. When the inner frames ascend, the joint parts 81 are released from the spring actuated dampers 82 by way of a following mechanism between a slanted face and a lever.

By conducting the above described operation, the four-way forming roll chocks and yokes are fixed at the predetermined position in the relevant stand. Then, by operating the pressing device, it is possible to carry out the determined forming work on the material to be worked which is passing through the four-way rolls. In order to form the stack body and withdraw it from the forming roll stand for exchanging the rolls, the above described operation has only to be executed in a reverse order.

Specifically, the side roll yokes 30, 40 are returned to a stacking position outside the center of the stand, by contracting and moving the two jacks 32, 42. Then, the clamper 70 of the T-shaped member 16 which is provided on the upper face of the upper roll chock 10 is released by the descending motion of the inner frames 5, 5, and the upper roll chock 10 is placed on the side roll yokes 30, 40 which are held by the inner frames 5, 5. Moreover, the lower jack 8 descends, and the lower roll chock 20 is standby on the exchanging rail 61. As the inner frames 5, 5 further descend, the side roll yokes 30, 40 are placed on the lower roll chock 20, and thus, the stack body 60 is formed. When the inner frames 5, 5 has descend to the lowermost position, the engagements between the upper and lower roll chocks 10, 20 and the inner frames 5, 5 are released, and the stack body 60 is allowed to be withdrawn toward the exchanging rail 61.

Embodiment 2

A structure of the embodiment 2 is such that the base board 2 can move by sliding in a direction perpendicular to the product proceeding direction, in the structure of the above described embodiment 1. Specifically, the base board 2 in FIG. 1A is replaced with a sliding base board 90 which is held on a floor so as to move in the horizontal direction, and the sliding base board 90 is allowed to be adjusted in position by means of jacks 91 which are fixed on the floor.

According to such structure, positional adjustments of all the four-way rolls in the stand can be carried out in a lump. The positional adjustments in the vertical direction with respect to the product proceeding direction can be effected by the ascending and descending motions of the inner frames 5, 5, and the positional adjustments in the horizontal direction can be effected by moving the sliding base board 90.

INDUSTRIAL APPLICABILITY

As apparent from the embodiments, the forming apparatus according to the invention has such a structure that the stack body of the roll chocks and yokes can be formed and disassembled with the ascending and descending motions of the inner frames, and also, the side rolls can be positioned by being engaged with the inner frames through connection with the jacks and positional adjustments, in the same manner. Because there is no necessity of providing the actuators such as a hydraulic cylinder to be used for forming and disassembling the stack body, and for positioning the roll chocks and yokes, except the actuator for moving the inner frames up and down, an extremely simple structure of the apparatus can be attained.

Moreover, when the rolls have to be exchanged, the rolls can be exchanged by transferring only the stack body of the roll chocks and yokes, and the stack body can be formed or disassembled only by operating the inner frames to ascend or descend. Because control mechanisms and operations of the actuators are not required on occasion of forming the stack body, it is possible to exchange the rolls by extremely simple operation.

The invention claimed is:

1. A forming apparatus comprising:
a pair of inner frames comprising a pair of plates and incorporated in an outer frame, the outer frame being uprightly provided on a base board, so that the inner frames are permitted to move only in a vertical direction;
upper and lower horizontal roll chocks and right and left side roll yokes, locked between the plates of the inner frames so that the upper and lower horizontal roll chocks and the right and left side roll yokes are separable from the inner frames by mechanical structures;
a pair of first position adjusting devices for moving the upper and lower horizontal roll chocks toward or apart from each other, the first position adjusting devices being provided on the outer frame or the base board;

a pair of second position adjusting devices for moving the right and left side rolls yokes toward or apart from each other in a state that the right and left side roll yokes are locked between the plates of the inner frames, one of the second position adjusting devices being installed at an end portion between the plates of the inner frames, and the other being installed on the outer frame or between the plates of the inner frames so as to move in the vertical direction; and an exchanging rail provided in a lower part of the outer frame in a horizontal direction perpendicular to a product proceeding direction, wherein the mechanical structures are configured to constrain the upper and lower horizontal roll chocks from moving with respect to the inner frames in the horizontal direction, and constrain the right and left side roll yokes from moving with respect to the inner frames in the vertical direction, upon an ascending movement of the inner frames, and thereby the respective roll chocks and yokes are locked to the plates of the inner frames at predetermined positions inside the plates of the inner frames, and the mechanical structures are configured to release the locks of the respective roll chocks and yokes to the plates of the inner frames, form a stack body of the roll chocks and yokes, mount the right and left side roll yokes on the lower horizontal roll chock, and mount the upper horizontal roll chock on the right and left side roll yokes, upon a descending movement of the inner frames, and thereby the stack body is allowed to be withdrawn along the exchanging rail.

2. The forming apparatus according to claim 1, wherein the mechanical structures are formed by engagements between strip members which are provided on faces of the frames and on the upper and lower horizontal roll chocks and right and left side roll yokes opposed to the faces of the frames, and grooves which are formed between the strip members.

3. The forming apparatus according to claim 1, wherein the base board on which the outer frame is uprightly provided is held so as to slide in the horizontal direction perpendicular to the product proceeding direction.

\* \* \* \* \*